United States Patent [19]
de Boer

[11] 3,988,090
[45] Oct. 26, 1976

[54] FILLING CHEESE MOULDS WITH A CURD PORTION

[75] Inventor: Geert de Boer, Lippenhuizen, Netherlands

[73] Assignee: Stork Amsterdam B.V., Amstelveen, Netherlands

[22] Filed: Mar. 31, 1975

[21] Appl. No.: 563,393

[30] Foreign Application Priority Data
Apr. 3, 1974 Netherlands .................. 7404583

[52] U.S. Cl. .................. 425/84; 425/168; 425/241
[51] Int. Cl.² .................. A23C 19/02
[58] Field of Search .................. 425/84, 241, 168

[56] References Cited
UNITED STATES PATENTS

| | | |
|---|---|---|
| 692,903 | 2/1902 | Rainbow .................. 425/241 X |
| 2,536,846 | 1/1951 | Grissinger .................. 425/241 |
| 3,041,153 | 6/1962 | Elder et al. .................. 425/84 X |
| 3,142,904 | 8/1964 | de Boer .................. 425/84 X |
| 3,217,411 | 11/1965 | de Boer .................. 425/199 |
| 3,317,999 | 5/1967 | Royer et al. .................. 425/84 |

*Primary Examiner*—Robert D. Baldwin
*Assistant Examiner*—David S. Safran
*Attorney, Agent, or Firm*—Edmund M. Jaskiewicz

[57] ABSTRACT

An apparatus for filling cheese moulds with curd portions issuing from vertical sieve cylinders with a feed for a whey/curd mixture at their top, the cylinders cooperate with the upperside of a table having an aperture. Under the table a conveyor is advancing moulds each consisting of a sleeve with a separate bottom movable in vertical direction by means of a cam surface. At least a part of said cam surface is displaceable for altering the vertical travel of said supporting bottoms so as to change the length of the curd portions.

5 Claims, 2 Drawing Figures

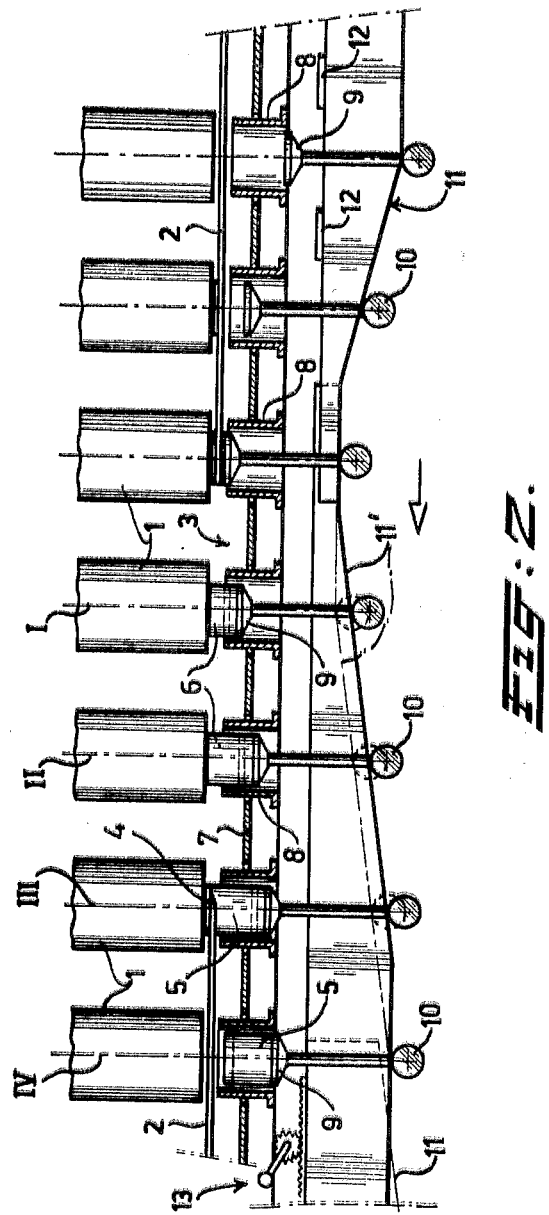

FILLING CHEESE MOULDS WITH A CURD PORTION

DISCUSSION OF THE PRIOR ART

My invention relates to an apparatus for filling cheese moulds with a curd portion, comprising a plurality of vertical cylindrical sieves cooperating at their open underside with a table top comprising an opening with a cutter said opening serving for passing through and subsequently, severing a portion of a curd column issuing from a cylindrical sieve, the apparatus further comprising a conveyor situated under the table top by which underneath the table opening bottomless cheese moulds (sleeves) are advances synchronously with the cylindrical sieves, while a plurality of vertically movable supporting surfaces are periodically moved up and down within a sleeve by means of a cam track, in the frame of the apparatus and underneath the conveyor. Such an installation is known from my U.S. Pat. No. 3,217,411.

Sometimes it is desirable to change the height of the severed curd column portions, such in connection with the size or the volume of the cheese eventually to be made. The known installation is provided with a table top 3 and a plurality of supporting surfaces 24. In order to change the height of the severed curd portions the table top was caused to sink over some distance in the known apparatus, so that the cutter could sever a shorter portion. The disadvantage of this method was, however, that there was a considerable space between the underside of the vertical cylindrical sieve and the table top, causing particles of the curd column to land on the table top resulting into contamination, as well as whey leakage.

SUMMARY OF THE INVENTION

My invention aims to provide a device with which it is possible to determine the height of curd portions to be severed, without the aforementioned trouble. For that purpose at least part of the cam track for the vertically movable supporting surfaces, is adjustable in a manner to influence the height of the severed curd portions. At the moment that the cutter contacts the curd column, each supporting surface will not be in its lowest position (as in the device described in the aforementioned U.S. Patent), but at a particular height within the cheese mould, so that the curd column within these cheese moulds has a length being smaller than the height of the cheese mould itself.

SURVEY OF THE DRAWINGS

FIG. 1 is a side elevation of a part of the apparatus;
FIG. 2 shows schematically the course of the severing operation for two different positions of the cam track.

DESCRIPTION OF A PREFERRED EMBODIMENT

Figure 2:
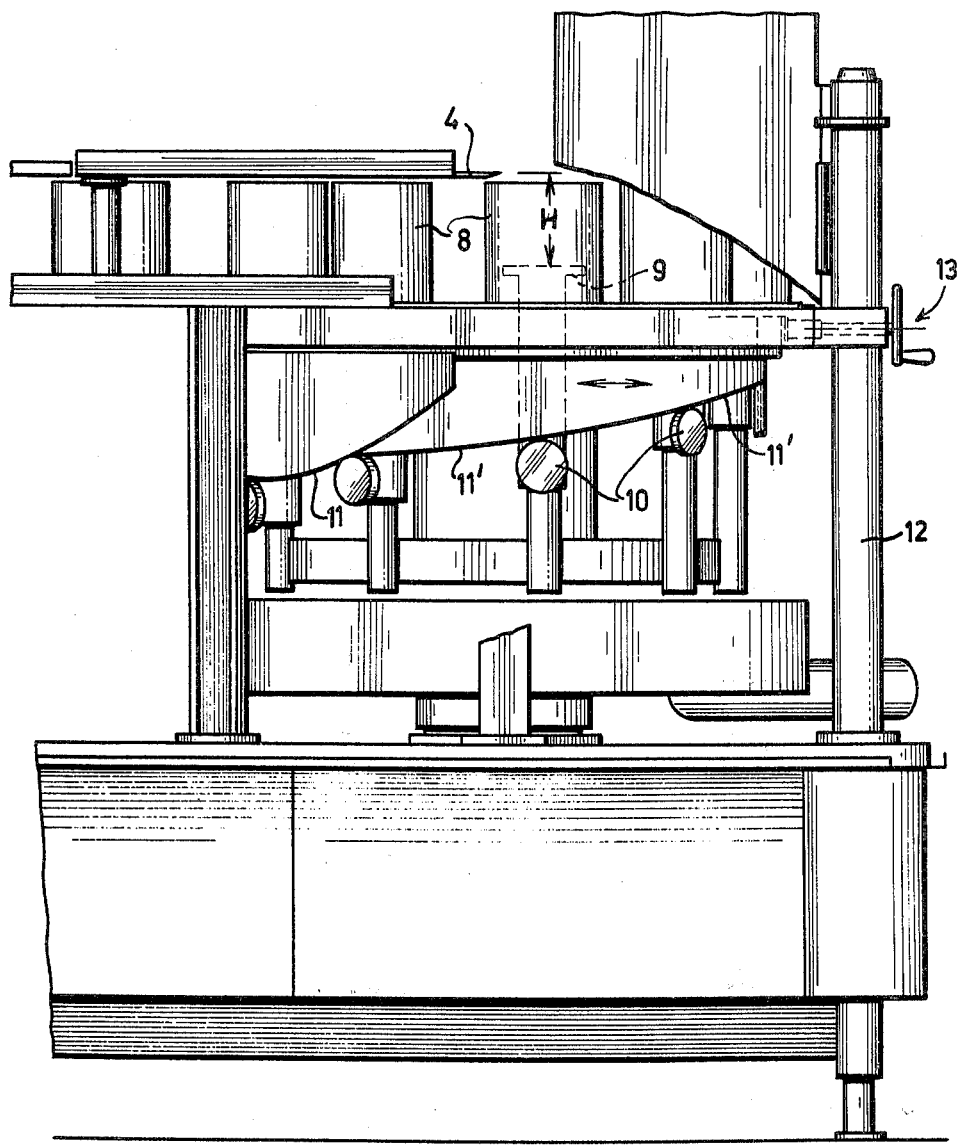

The construction of the apparatus is substantially in conformity with the one as described in my U.S. Pat. No. 3,217,411. A plurality of vertical cylindrical sieves 1 are positioned in an annular configuration and are provided on the upper side with a (non depicted) inlet for a whey/curd mixture. On their open underside said sieves cooperate with a table top 2. In this table is an opening 3 (see FIG. 2) with a cutter 4 for passing and subsequently severing a portion 5 of a curd column 6 from a cylindrical sieve 1. The apparatus is further provided with a conveyor 7 situated under the table 2, by which conveyor a plurality of bottomless cheese moulds or sleeves 8 can be moved sunchronously with the cylindrical sieves 1 underneath the opening 3 in the table. A plurality of vertically movable supporting surfaces 9 are disposed which each are connected with a roller 10. These rollers cooperate with a cam track 11 which is secured in the frame 12 of the apparatus, the cam track being situated underneath the conveyor 7.

Rollers 10 are resiliently and upwardly pressed against cam track 11. In conformity with the operation as described in my U.S. Patent referred hereinbefore, an up-and downward movement of the supporting faces 9 will be generated, as schematically shown in FIG. 2, during rotation of the cylindrical sieves 1, the conveyor 7 with the cheese moulds 8 and the supporting surfaces 9 connected therewith. Each supporting surface 9 moves downward at the moment that the curd column above it bears on the table top 2. When moving upwards, each supporting surface 9 passes therefore through an entirely empty cheese mould 8.

The provision according to the invention consists in that at least the part of the cam track 11 by which the rollers 10 (and therefore also the supporting surfaces 9) are moved downwards, is movably secured in frame 12. This adjustable part is donated by 11' and shows a flat portion with a length L coinciding with a corresponding flat portion of the stationary part 11 of the cam track.

Means 13 effect a movement of the cam track 11' over an arcuate length maximally amounting to the value L. The result of this displacement is visible in FIG. 2. In this Figure the maximal displacement of the cam track 11' is depicted by a dotted/dash line. In this situation each supporting surface 9 remains for some time in its highest position with the curd column bearing thereon (see phase I). The downward movement of the supporting surface lags relative to the movement caused by the cam track 11' in the position shown in full lines (see phase II). At the moment that the curd column 6 is severed by cutter 4, the supporting surface 9 is not yet in its lowest position (see phase III), so that the height of the severed curd portion 5 is smaller than the maximal height (see phase IV). In FIG. 1 the height H of curd portion 5 is indicated at the beginning of the severing operation to be performed by cutter 4. This moment is lying between phases II and III as shown in FIG. 2.

It is obvious that with the provision according to the invention one can maintain a definite position between table top 2 and cylindrical sieves 1, so that any contamination by detached curd portions is restricted to a minimum. It should be noted that the apparatus according to the invention is described with reference to an annular cam track consisting of two parts 11 and 11'. It is, however, also possible to manufacture this cam track in one piece. It goes beyond saying that adjustment of the cam track can be effected in any other way than with the provision 13 as shown in the drawing.

What I claim is:
1. An apparatus for filling cheese moulds with a curd portion comprising a plurality of vertical, cylindrical sieves having downwardly directed open ends, a table top cooperating with said open ends and having an opening therein, cutter means at an edge of said table opening for passing through and severing a portion of a curd column issuing from a said sieve, a conveyor beneath said table top, a plurality of bottomless cheese moulds on said conveyor which is advanced to advance said moulds synchronously with said sieves, a plurality of vertically movable supporting surfaces in said moulds respectively and movable between fixed upper and lower positions means including an annular cam track underneath said conveyor for periodically moving said supporting surfaces up and down within said moulds, said cam track having a portion thereof to move said supporting surfaces periodically up and down, and means for moving arcuately parallel to the plane of said conveyor advance at least said cam track portion to vary the height of the severed curd portions by changing the phase relationship between said cutter means and said cam track portion.

2. An apparatus according to claim 1 wherein said cam track portion is movable and said cam track comprises a second portion which is stationary.

3. An apparatus according to claim 2 and means for rotatably adjusting said movable cam track portion.

4. An apparatus according to claim 1 wherein said cam track is movably mounted in its frame.

5. An apparatus according to claim 4, wherein said annular cam track is one piece, means for rotatably adjusting said cam track.

* * * * *